United States Patent [19]

Gall

[11] Patent Number: 4,700,235
[45] Date of Patent: Oct. 13, 1987

[54] METHOD AND APPARATUS FOR PRODUCING HALF-TONE PRINTING FORMS WITH ROTATED SCREENS ON THE BASIS OF RANDOMLY SELECTED SCREEN THRESHOLD VALUES

[75] Inventor: Winrich Gall, Klausdorf, Fed. Rep. of Germany

[73] Assignee: Dr. Ing. Rudolf Hell GmbH, Fed. Rep. of Germany

[21] Appl. No.: 668,835

[22] Filed: Nov. 6, 1984

[30] Foreign Application Priority Data

Nov. 14, 1983 [EP] European Pat. Off. ............ 83111359

[51] Int. Cl.$^4$ .................. H04N 1/40; H04N 1/23; H04N 1/46; G03F 3/08
[52] U.S. Cl. .................................... 358/283; 358/75; 358/298
[58] Field of Search ................... 358/283, 75, 280, 298

[56] References Cited

U.S. PATENT DOCUMENTS

| | | | |
|---|---|---|---|
| 3,272,918 | 9/1966 | Koll et al. | 358/298 |
| 3,885,244 | 5/1975 | Keller | 358/80 |
| 4,245,258 | 1/1981 | Holladay | 358/280 |
| 4,350,996 | 9/1982 | Rosenfeld | 358/75 |
| 4,449,150 | 5/1984 | Kato | 358/283 |
| 4,499,489 | 2/1985 | Gall et al. | 358/75 |
| 4,578,714 | 3/1986 | Sugiura et al. | 358/280 |

FOREIGN PATENT DOCUMENTS

| | | |
|---|---|---|
| 1193534 | 5/1965 | Fed. Rep. of Germany . |
| 1597771 | 5/1970 | Fed. Rep. of Germany . |
| 189782 | 10/1984 | Japan .................................. 358/283 |

*Primary Examiner*—James J. Groody
*Assistant Examiner*—Randall S. Svihla
*Attorney, Agent, or Firm*—Hill, Van Santen, Steadman & Simpson

[57] ABSTRACT

In a method and apparatus for producing half-tone printing forms with screens having arbitrary screen angles and screen width, screen dots are exposed on a recording medium by means of a recording element whose exposure beam is switched on and off by a control signal. The recording medium is sub-divided into a plurality of areal elements which are exposed or not exposed by the exposure beam as a function of the control signal. All areal elements exposed in a screen mesh of the rotated screen to be recorded form a respective screen dot. At least two matrices in the form of matrix memories are provided, the individual matrix elements thereof having screen threshold values allocated to them. The screen threshold values forming a screen hill represent the periodic basic structure of a screen mesh and are different for at least one tonal range in the individual matrices. During recording, those matrix elements in the individual matrices whose positions within the respective matrices correspond to the positions of the swept areal elements within a screen mesh are identified. The screen threshold values of the identified matrix elements are called in. Controlled by a random generator, one of the called screen threshold values is randomly selected and compared to an image signal value acquired by means of scanning an original. The control signal for the exposure beam is derived from the comparison, whereby a decision is made on the basis of the signal comparison as to whether the corresponding areal element is to be exposed or not as part of a screen dot.

15 Claims, 5 Drawing Figures

METHOD AND APPARATUS FOR PRODUCING HALF-TONE PRINTING FORMS WITH ROTATED SCREENS ON THE BASIS OF RANDOMLY SELECTED SCREEN THRESHOLD VALUES

BACKGROUND OF THE INVENTION

The invention relates to the field of electronic reproduction technology and concerns a method for producing rastered or half-tone color separations for multicolor printing with screens having an arbitrary screen angle and screen width, and also concerns an apparatus for the implementation of the method with a color scanner.

DESCRIPTION OF THE PRIOR ART

In color scanners for the production of half-tone color separations, three trichromatic color values which are a measure of the color components red, green, and blue of the scanned colors, are acquired as signals by means of point-by-point and line-by-line opto-electronic scanning of a color original. In the case of four-color printing, a color correction computer corrects the trichromatic color value signals according to the standards of subtractive color mixing into four color separation signals for the color separations "yellow", "magenta", "cyan" and "black". The color separation signals are a measure for the sizes of the screen dots with which the inks yellow, magenta, cyan and black are printed on the print medium. Recording elements in the form of write lamps undertake the point-by-point and line-by-line recording of the four half-tone color separations, also referred to as a color set, on a radiation-sensitive recording medium. The half-tone color separations serve as printing forms for the multicolor printing. The superimposed printing of the screen dots onto the print medium to form a multicolor reproduction then ensues in a printing machine with the assistance of the differently inked printing forms of a color set.

Such rasters or screens, as is known, are formed of a plurality of periodically repeating and neighbouring screen meshes in which screen dots of different sizes are recorded as a function of the tonal values measured by scanning of the original.

Moire patterns which have a disturbing effect particularly when viewing the finished printing can occur due to the superimposed printing of screen dots. The visibility of moire patterns, as is known, can be reduced since the screens of the individual color separations of the color set are printed on top of one another and rotated with respect to one another. For this reason, the color separations must be recorded with screens having different screen angles. What is achieved by means of the rotated superimposed printing of the individual screens is that the periods of the moire patterns are either too small or too large in order to be perceived by the human eye as being disturbing. For example, it is standard in practice to record the color separation "yellow" with a screen angle of 0°, the color separation "magenta" with a screen angle of −15°, the color separation "cyan" with a screen angle of +15°, and the color separation "black" with a screen angle of +45°.

A method and apparatus for producing half-tone color separations having screens with arbitrary screen angles and screen width is already known from British Patent publication No. 2,026,283, corresponding to U.S. Ser. No. 479,974, now U.S. Pat. No. 4,499,489, issued Feb. 12, 1985, incorporated by reference herein. Given this method, the recording medium is sub-divided into areal or resolution elements and the individual screen dots are composed of recorded areal elements. The decision regarding recording or non-recording of the individual areal elements as parts of screen dots is accomplished by means of a comparison of the tonal values acquired in the scanning of the original to the screen threshold values or screen values of a matrix which represents a so-called screen hill.

Such a screen hill represents the basic structure of the screen meshes or screen grid elements of a screen and defines the size of the screen dots to be recorded as a function of the tonal values of the scanned original, the position of the screen dots within the screen meshes and the shape of the screen dots.

The screen threshold values are deposited in a memory matrix at those respective memory locations which correspond to the position of the corresponding matrix elements within the matrix. During recording of the half-tone color separations, a recording element sweeps the individual areal elements line-by-line and a decision is executed for every swept areal element on the basis of the tonal values measured in the original as to whether it should be exposed as part of a screen dot or not. During the check, the position of the currently swept areal elements is determined. The matrix element of the matrix or respective memory location of the memory matrix whose position within the matrix corresponds to the identified position of the swept areal element in the corresponding screen mesh is identified. This occurs for every swept areal element within a screen mesh. The screen threshold value allocated to the identified matrix elements is then called in. The called-in screen threshold value is compared to the tonal value representative of the corresponding screen mesh, whereby a recording signal which engages or does not engage the recording element for recording the corresponding areal element is derived from the comparison.

Additional steps with which the moire patterns which still occasionally appear despite a screen rotation can be reduced are likewise already specified in U.S. Ser. No. 479,974. A disturbing pattern formation cannot be completely suppressed in extreme cases, even by means of the additional steps.

Another method for the production of half-tone reproduction is known from Japanese Kokai No. 57-119564, corresponding to U.S. Pat. No. 4,449,150, incorporated herein by reference, wherein screen dots of a constant size are exposed as a whole but are not composed of areal elements. A threshold matrix is sub-divided into matrix elements and a screen threshold value is allocated to each matrix element in this method as well. All of the screen threshold values, as a group however, do not form a screen hill. Rather, each screen threshold value defines a position of the screen dot for a specific tonal value within a print matrix on the recording medium which corresponds to the threshold matrix. When recording the reproduction, a plurality of image points which correspond to the plurality of matrix elements of the threshold matrix are respectively combined into an image point matrix. The respective tonal value and screen threshold value of positionally coinciding image points within the image point matrix and matrix elements of the threshold matrix are compared to one another in order to determine the position of the screen dots to be recorded.

In order to reduce the formation of moire patterns, a plurality of threshold matrices having a different distribution of the screen threshold values are provided in the known method. One of the threshold matrices for the comparison of tonal values and screen threshold values is randomly called in for each image point matrix, whereby a random distribution of the individual screen dots within the print matrix is achieved.

Disadvantages of the method known from the Japanese Kokai No. 57-119654 are that half-tone color separations having arbitrary screen angles and screen width cannot be recorded and that only screen dots of constant size can be generated within a random distribution, whereby disturbing moire patterns cannot be suppressed in all cases.

SUMMARY OF THE INVENTION

It is an object of the invention to provide a method and apparatus for producing of half-tone color separations having rasters or screens with arbitary screen angle and screen width by means of which the known method can be improved upon so that the formation of disturbing moire patterns is now nearly impossible.

According to the improvement of this invention, at least one further matrix is generated and screen threshold values are allocated to the matrix elements of the further matrix. The screen threshold values differ in the further matrix as compared to a first matrix generated in accordance with the known prior art method. This difference occurs for at least one tonal range. For each areal element within a screen mesh, a matrix element is determined whose position within the first matrix and further matrix corresponds to the position of the areal element within the corresponding screen mesh. For the purpose of comparison to the image signal value, a randomly selected screen threshold value is provided from the screen threshold values associated with the identified matrix element in the first matrix and further matrix.

DESCRIPTION OF THE PREFERRED EMBODIMENTS

The operation and structure of the prior art systems shall first be described.

Figure 1:
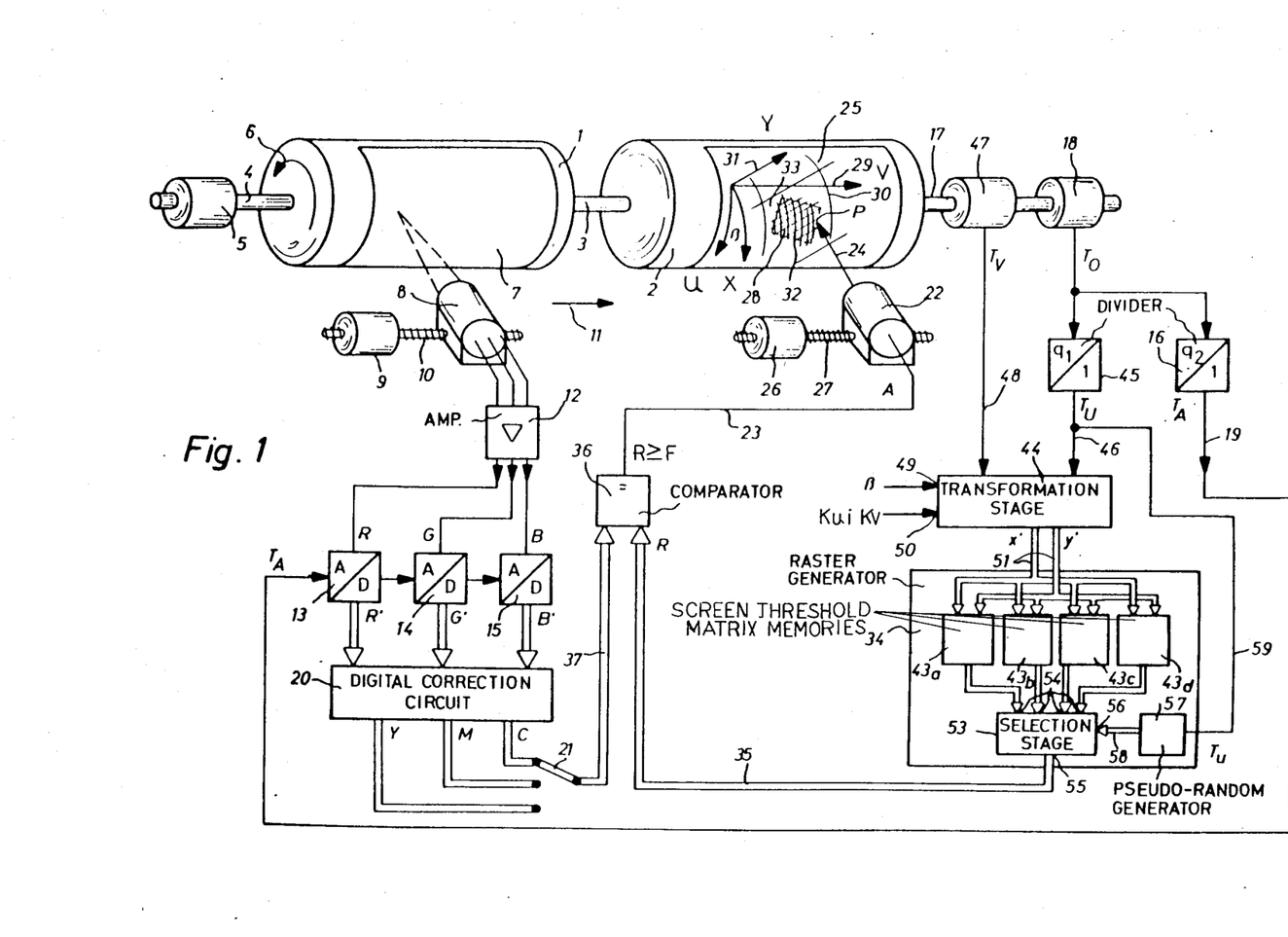
FIG. 1 is an illustrative embodiment of an apparatus for the production of half-tone printing forms.

FIG. 1 shows an illustrative embodiment of an apparatus for producing half-tone color separations having rasters or screens with arbitrary screen angle and screen width in a color scanner.

A scanning drum 1 and a recording drum 2 of a color scanner that are not shown in greater structural detail are connected by a shaft 3 and are driven in common by a motor 5 in the direction of an arrow 6 via a shaft 4. A color master 7 is mounted on the scanning drum 1, the color master 7 being scanned point-by-point and line-by-line by an opto-electronic scanning element 8 with the assistance of color splitters, correction filters and opto-electronic transducers. The measured color value signals are a measure for the intensities of the basic or primary color components red, green, and blue of the scanned colors in the color original 7. The opto-electronic scanning element 8 is moved axially along the rotating scanning drum 1 in the direction of an arrow 11 by means of a motor 9 and a spindle 10.

The analog measured color value signals R, G, and B proceed via an amplifier 12 following the opto-electronic scanning element 8 to analog-to-digital converters 13, 14, and 15 in which the measured trichromatic color value signals R, G, and B are converted into digital trichromatic color value signals R', G', and B' by means of a scan clock sequence $T_A$.

The scan clock sequence $T_A$ arises from a clock sequence $T_0$ by means of frequency division with a division ratio of $q_2:1$ in a divider stage 16. The clock sequence $T_0$ is generated in a clock generator 18 connected to shaft 17 of the recording drum 2. The scanning clock sequence $T_A$ is supplied to the analog-to-digital converters 13, 14, and 15 via a line 19.

In a digital correction circuit 20, the digital trichromatic color value signals R', G' and B' are converted by means of a color and/or gradation correction into corrected color separation signals Y, M, and C for production of the color separations "yellow", "magenta", and "cyan" and, in the case of a four-color printing, are additionally converted into the color separation signal K for the recording fo the black separation. The digital color separation signals are a measure of the tonal gradation values which mut be converted into corresponding screen dot sizes when recording the color separations. The digital color separation signals Y, M, and C have a word length of, for example, 8 bits so that 256 gray scale values can be discriminated.

A digital correction circuit for color and/or gradation modifications is known, for example, from German AS No. 1 597 771, corresponding to U.S. Pat. No. 3,885,244, incorporated herein by reference.

An apparatus for scale modification between the color original and reproduction can also precede or follow the correction circuit 20. This apparatus is designed, for example, in accordance with German Pat. No. 1 193 534, corresponding to U.S. Pat. No. 3,272,918, incorporated herein by reference.

In the described embodiment, the digital color separation signals Y, M, and C proceed to a selection switch 21 with which one of the color separation signals Y, M, or C required for recording one of the color separations is selected as a color separation signal F. A recording element 22 generates at least one recording beam 24 that can be switched on and off by means of a recording signal A on a line 23. The recording beam 24 records the screen dots of the color separation point-by-point and line-by-line onto a radiation-sensitive, for example, light-sensitive, recording medium 25 which is situated on the rotating recording drum 2, whereby the screen dot sizes are defined by the tonal values acquired when scanning the original. Driven by a motor 26 and a spindle 27, the recording element 22 moves axially along the recording drum 2 in the direction of the arrow 11 during the recording of the color separation.

The recording medium 25 is to be thought of as being sub-divided into a plurality of areal or resolution elements 28 which are positionally defined by means of coordinate values u and v of an apparatus-associated, orthogonal UV coordinate system 29 whose U coordinate axis is oriented in recording direction (circumferential direction) and whose V coordinate axis is oriented in a feed direction (axial direction) of the recording element 22. The individual areal elements 28 are defined by corresponding coordinate values x and y in an XY coordinate system 31 aligned in the direction of the rotated screen 30 and describing the screen angle $\beta$ of the rotated screen 30 with the apparatus-associated UV coordinate system 29. The screen dots within the screen meshes of the rotated screen 30, of which only one screen dot 32 in a recorded screen mesh 33 is indicated in FIG. 1, are composed of recorded areal elements 28 during the production of the half-tone color separations, whereby the plurality of recorded areal elements 28 within a screen mesh 33, the screen dot size, and the arrangement of these areal elements 28 relative to one another respectively determine the shape of the screen dots 32.

During the recording of the color separation, the recording element 22 sweeps the individual areal elements 28 in the recording direction due to the relative motion of the recording drum 2, and a determination is made for every swept areal element 28 as a function of the tonal values measured in the color original 7 as to whether the momentarily swept areal element 28 is or is not to be recorded as part of a screen dot 32.

The decision concerning the recording of the areal elements 28 is undertaken by means of a comparison of the measured tonal values or of the selected color separation value F to locus-dependent screen values or screen threshold values $R_a$. Accordingly, the recording signal A on the line 23 is derived from the comparison, the recording signal A engaging or not engaging the recording beam 24 for recording an areal element 28 dependent upon the result of the comparison. The screen threshold values $R_a$ having a word length of 8 bits, like the color separation values, are supplied by a raster generator 34 and are supplied via data lines 35 to a comparator 36 which is also provided with the selected color separation value Y, M, or C on data lines 37. The output signal of the comparator 36 is the recording signal A on the line 23.

Figure 2:
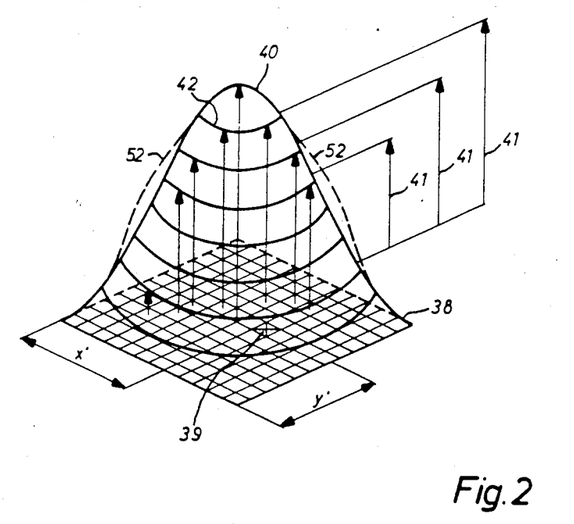
FIG. 2 is a graphic representation for the explanation of a screen hill.

The formation of the screen threshold values $R_a$ shall first be explained with reference to a graphic illustration in FIG. 2. A matrix 38 is sub-divided into a number of matrix elements 39 which are positionally defined within the matrix 38 by coordinate values x' and y'. The matrix corresponds to the area of a screen mesh. Every matrix element 39 having the coordinate values x' and y' has a screen threshold value $R_a = f_a(x', y')$ allocated to it. The screen threshold values $R_a$ of the matrix 38 as a group represent the basic structure of a screen mesh which periodically repeats as a complete period from screen mesh to screen mesh. Of course, such a complete period could also include a complete period of other functions such as screen hills inverted with respect to one another, pyramids, etc. When the screen threshold values $R_a$ are allocated to the individual matrix elements 39 as shown in FIG. 2 as coordinate values of a three-dimensional coordinate system, then a so-called screen hill 40 arises, the base area thereof being on a screen mesh to be recorded.

Various tonal values are shown as arrows 41 having correspondingly different lengths next to the screen hill 40 in the direction of the third coordinate. When the decision criterion states that all of those areal elements forming a screen dot within a screen mesh are recorded whose corresponding matrix elements in the matrix have screen threshold values equal to or greater than the tonal value of the screen mesh, then a cross-sectional area 42 of the screen hill 40 lying at the level of said tonal value defines the screen dot size to be recorded.

In the practical illustrative embodiment, the screen hill $R_a = f_a(x', y')$ is deposited in a matrix memory 43a within the raster generator 34 of the circuit arrangement according to FIG. 1. A memory location at which the screen threshold value $R_a$ of the allocated matrix element 39 is deposited is allocated to each matrix element 39 in the matrix memory 43a. Each memory location is selectable by means of that address which corresponds to the coordinate values x' and y' of the allocated matrix element 39. Let, for example, the matrix memory 43a comprises 32×32 memory locations which are then selectable by 32 x' addresses and 32 y' addresses.

Figure 3A:
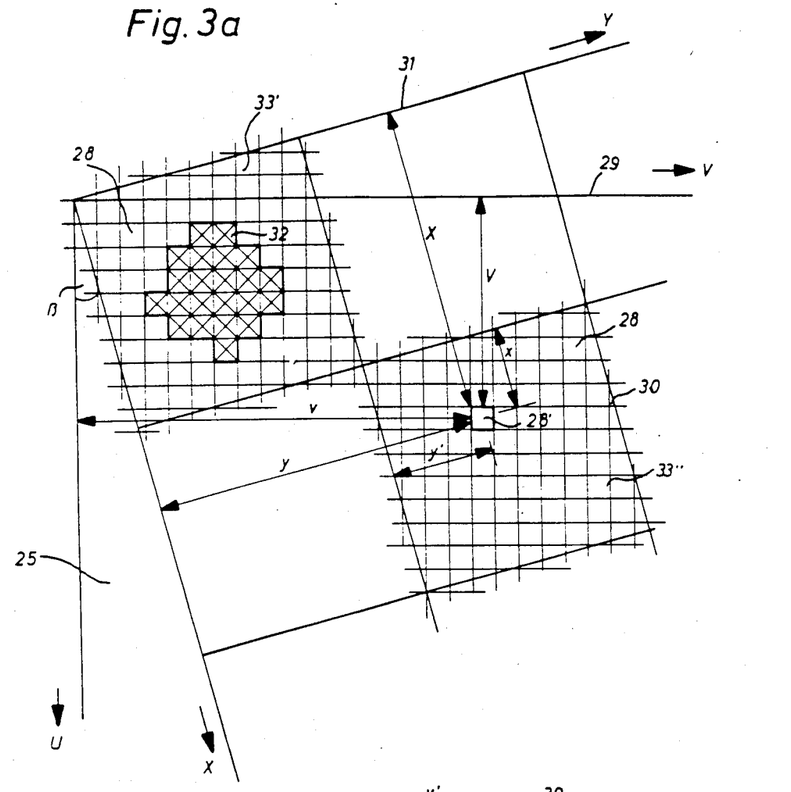
FIG. 3a is an enlarged excerpt from the recording medium.
Figure 3B:
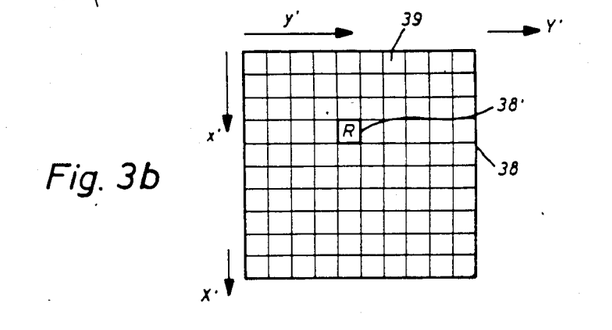
FIG. 3b is a matrix.

During the production of the color separation, the topically allocated screen threshold value R must then be selected from the screen hill 40 for each areal element 28 swept by the recording element 22 and must be offered for the comparison. The selection of the screen threshold values R shall first be explained with reference to a further graphic illustration in FIG. 3.

FIG. 3a shows an enlarged excerpt from the recording medium 25 having the apparatus-associated UV coordinate system 29 whose coordinate axes are aligned in a recording direction and perpendicular thereto. A screen 30 is shown rotated by the screen angle $\beta$ to the UV coordinate system 29. The XY coordinate system 31 is also shown which is aligned in the direction of the rotated screen 30 and describes the screen angle $\beta$ with the UV coordinate system 29. The areal elements 28 into which the recording medium 25 must be imagined as being sub-divided, are indicated in the screen meshes 33' and 33'' of the rotated screen 30.

The recorded areal elements 28 as a group which are marked by crossed lines forms a screen dot 32 in the screen mesh 33'. One recorded areal element 28' is emphasized in the screen mesh 33'' by means of thicker lines. Let this areal element 28' be the areal element momentarily swept by the recording element 22 for which the topically allocated screen threshold value $R_a$ of the screen hill 40 must be selected for the decision regarding a recording or non-recording. FIG. 3b shows the matrix 38 comprising the matrix elements 39, that is the matrix memory 43a with its memory locations. Each matrix element 39, that is each memory location, is defined by a coordinate pair, that is address pair x' and y'. The discovery of the screen threshold value R corresponding to the swept areal element 28' occurs since first the position of the swept areal element 28' within the screen mesh 33'' and then the matrix element 39' positionally corresponding thereto within the matrix 38 are determined. This again is emphasized in FIG. 3b by means of thicker lines. The screen threshold value R allocated to the corresponding matrix element 39' is the screen threshold value R sought for the comparison.

For this purpose, the locus coordinates u and v of the swept areal element 28' are first identified in the UV coordinate system and the locus coordinates x and y in the XY coordinate system 31 are calculated therefrom according to equations (1):

$$x = K_u \cdot u \cdot \cos \beta + K_v \cdot v \cdot \sin \beta$$
$$y = -K_u \cdot u \cdot \sin \beta + K_v \cdot v \cdot \cos \beta \qquad (1)$$

In these equations, "β" is the screen angle of the screen to be recorded and the coefficients "$K_u$" and "$K_v$" are scaling factors.

The coordinate values x' and y' are then calculated from the coordinate values x and y by modulo arithmetic according to equations (2). These represent the position of the swept areal element 28' with the screen mesh 33'', that is the position of the corresponding matrix element 39' within the matrix 38, and thus this simultaneously represents the address for the matrix memory 43a at which the screen threshold value R representative of the corresponding areal element 28' is deposited.

$$x' = x \cdot \text{mod } x_0$$

$$y' = y \cdot \text{mod } y_0 \quad (2)$$

The values $x_0$ and $y_0$ thus represent the number of matrix elements 39 within the matrix 38 in the direction of the axes of the XY coordinate system 31.

The identification of the coordinate values or addresses x' and y' is realized in the circuit arrangement of FIG. 1 in a transformation stage 44. Basic steps Δu and Δv which correspond to the expanse of an areal element 28 in the direction of the U coordinate axis and of the V coordinate axis are first defined. The locus coordinates u and v are then identified by means of counting the basic steps Δu and Δv with the assistance of two clock sequences $T_u$ and $T_v$ in the transformation stage 44 according to equation (3), whereby $C_u$ and $C_v$ are the number of counted clocks of the clock sequences $T_u$ and $T_v$.

$$u = C_u \cdot \Delta u$$

$$v = C_v \cdot \Delta v \quad (3)$$

The clock sequence $T_u$ is acquired from the clock sequence $T_0$ of the clock generator 18 by means of frequency division with a division ratio $q_1$:1 in a divider stage 45 and is supplied to the transformation stage 44 via a line 46. A basic step Δu is allocated to each clock of the clock sequence $T_u$. The lengths of the basic steps can be varied via the frequency of the clock sequence $T_u$ and can, under given conditions, be matched to the required precision. A circumferential pulse generator 47 which is likewise coupled via the shaft 17 to the recording drum 2, generates a circumferential pulse $T_v$ after every advance step of the scanning element 8 and of the recording element 22 to the next line, a basic step Δv being respectively allocated to the circumferential pulse $T_v$. The circumferential pulses $T_v$ are supplied to the transformation stage 44 via a line 48. Alternatively, the locus coordinates u and v can also be identified by means of continuous addition of the basic steps Δu and Δv, whereby the clocks of the clock sequence $T_u$ and the circumferential pulses $T_v$ respectively initiate an addition step. The screen angle "β" is input into the transforming stage 44 via programming input 49 and the scaling factors "$K_u$" and "$K_v$" required for the coordinate transformation according to equation (1) via programming input 50. The coordinate values x' and y' generated in the transformation stage 44 are supplied to the raster generator 34 via address lines 51.

Now the improvement of the invention will be described in detail.

At least one further matrix comprising screen threshold values which are respectively different for at least one tonal range in the matrices is provided according to the invention. In the described circuit arrangement, the raster generator comprises, for example, three additional matrix memories 43b, 43c, and 43d in which screen hills $R_b = f_b(x'y')$, $R_c = f_c(x'y')$ and $R_d = f_d(x'y')$ are deposited. These screen hills differ from one another and from the screen hill $R_a = f_a(x'y')$ of the matrix memory 43a for at least one tonal range. Such a screen hill altered in shape-wise fashion is indicated in FIG. 2 by the progressions 53. Depending upon the design of the screen hills, thus, positionally coinciding matrix elements or memory locations have identical or different screen threshold values $R_a$, $R_b$, $R_c$ and $R_d$ allocated to them. All matrix memories 43a, 43b, 43c, and 43d are addressed in parallel via the address lines 51.

Due to the parallel addressing of the matrix memories 43a, 43b, 43c, and 43d with the addresses x' and y', thus four identical or non-identical screen threshold values $R_a$, $R_b$, $R_c$, and $R_d$ are simultaneously read out for each swept areal element 28. Only one of these is randomly selected and respectively forwarded to the comparator 36. A selection stage 53 is provided in the raster generator 34 for the random selection of the screen threshold values $R_a$, $R_b$, $R_c$, and $R_d$. The inputs 54 of the selection stage 53 are supplied with the screen threshold values $R_a$, $R_b$, $R_c$, and $R_d$ to be selected and the selected screen threshold values at the output 55 thereof as a function of control bits randomly present at a control input 56 of the selection stage 53. The random control bits are generated in a pseudo-random generator 57 and are supplied to the selection stage 53 via a control line 58. The pseudo-random generator 57 is clocked by the clock sequence $T_u$ which is supplied thereto via a line 59.

Since the comparison of the scanned tonal values now occurs with randomly acquired screen threshold values, the decision regarding a recording or non-recording of an areal element also depends on chance, so that the screen dots are recorded with different shapes dependent on chance for specific tonal ranges for which the screen threshold values in the individual screen hills have been modified.

Figure 4:
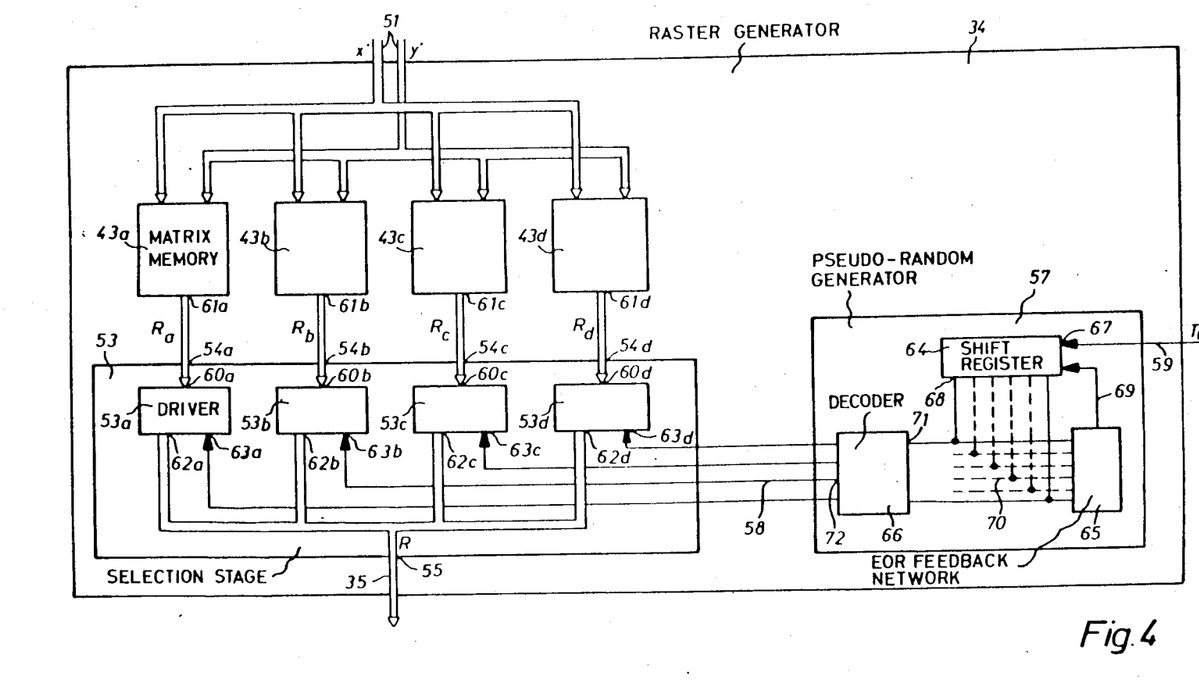
FIG. 4 is an illustrative embodiment of a raster generator.

FIG. 4 shows an illustrative embodiment of the raster generator 34 comprising the four matrix memories 43a, 43b, 43c, and 43d, the selection stage 53, and the pseudo-random generator 57.

The selection stage 53 is formed, for example, of four line drivers 53a, 53b, 53c, and 53d of the type SN74LS244 of Texas Instruments with data inputs 60a, 60b, 60c, and 60d, data outputs (3 state outputs) 62a, 62b, 62c, and 62d, and with control inputs 63a, 63b, 63c, and 63d. The functioning of such a power driver with 3 state outputs is as follows. Given an L level of the control bit at the control input of a power driver, the data outputs are at the L or H level in accordance with the levels of the information at the corresponding data inputs. In other words, the data outputs and data inputs are through-connected. Given the H level of the control bit, by contrast the data outputs have a high-resistance or are inhibited. In the embodiment, the data outputs 61a, 61b, 61c, and 61d of the matrix memories 43a, 43b, 43c, and 43d are connected via the inputs 54a, 54b, 54c, and 54d of the selection stage 53 to the data inputs 60a, 60b, 60c, and 60d of the line drivers 53a, 53b, 53c, 53d, whereas the data outputs 62a, 62b, 62c, and 62d are interconnected and form the data output 55 of the selection stage 53.

Of the control bits randomly generated in the pseudo-random generator 57, one is always at the L level so that only one of the matrix memories 43a, 43b, 43c, and 43d is randomly connected to the data lines 35, and a screen threshold value $R_a$, $R_b$, $R_c$, or $R_d$ of the corresponding matrix memory 43a, 43b, 43c, or 43d is forwarded to the comparator 36. The pseudo-random generator 57 consists of an n-bit shift register 64, of an exclusive OR feedback network 65, and of a decoder 66. The input 67 of the shift register 64 is supplied with the block sequence $T_u$ on the line 59. Dependent upon which outputs 68 of the shift register 64 are fed back via the feedback network 65 and the line 69 to the shift register 64, quasi-random sequences of output values with the H or L level which repeat during a long time interval, arise on the lines 70. Two of these sequences of output values are forwarded to the inputs 71 of the decoder 66, for example type SN74139N of Texas Instruments. As a function of the random H or L level of these two sequences of output values, four control bits of which one is always randomly at the L level arise at the outputs 72 of the decoder 66.

The invention is not restricted to the illustrative embodiment described in FIG. 1. It lies within the scope of the invention that, instead of recording a single, selected color separation, all color separations are simultaneously recorded on the drum with the assistance of a plurality of recording elements and corresponding control devices. They are recorded thereupon either side-by-side in the axial direction and/or serially behind one another in the circumferential direction. Alternatively to the described on-line mode, the production of the color separations can also occur in an off-line mode. In this case, all color separation values acquired during the scanning of the original are deposited in a full image memory and are called in as needed for recording the color separations. It also lies within the scope of the invention to employ a recording element which generates a plurality of recording beams that can be separately switched on and off by means of corresponding recording signals and thus a plurality of areal elements can be simultaneously recorded. In this case, the circuit arrangement of FIG. 1 comprised a plurality of raster generators and comparators corresponding to the plurality of recording beams such as explained in detail in, for example, German OS No. 28 27 596, corresponding to U.S. Pat. No. 4,499,489 cited above, incorporated herein by reference.

Although various minor changes and modifications might be suggested by those skilled in the art, it will be understood that I wish to include within the scope of the patent warranted hereon, all such changes and modifications as reasonably come within my contribution to the art.

I claim as my invention:

1. In a method for producing from an original a halftone printing form having a rotated screen with an arbitrarily selectable predetermined screen angle and screen width with a recording element relatively moved across a recording medium, the screen comprising a plurality of periodically repeated screen meshes in which screen dots of different sizes are recorded as a function of tonal values of the original, the method including the steps of:
    (a) scanning the original optoelectronically point-by-point and line-by-line to generate image signal values representing the tonal values of the original;
    (b) generating a first matrix comprising a plurality of matrix elements, said matrix elements having screen threshold values representing tonal values allocated to them, said screen threshold values representing a basic screen dot structure employed to produce the different size screen dots to be recorded in the screen meshes of the screen;
    (c) subdividing the recording medium into a plurality of adjacent areal elements which are aligned in a recording direction of the recording element, with areal elements falling within the screen meshes being employed to form the screen dots in the screen meshes;
    (d) during recording, comparing for each of the adjacent areal elements within a screen mesh at least one of said image signal values with a screen threshold value corresponding to the location of each said areal element within the screen mesh; and
    (e) generating a recording signal for each of said areal elements based on a result of said comparing step to control the recording element, said recording signal determining whether each said areal element is recorded or not as part of a screen dot within the screen mesh;
    the improvement comprising the steps of:
        (a) generating at least one further matrix having matrix elements and allocating screen threshold values to the matrix elements of said further matrix, said screen threshold values of said further matrix differing as compared with the screen threshold values of said first matix for at least one tonal range;
        (b) determining for each of said areal elements within a screen mesh a first matrix element and a further matrix element whose positions within the respective first matrix and further matrix correspond to the position of each said areal element within said screen mesh; and
        (c) randomly selecting one of the first and further screen threshold values allocated to the determined first and further matrix elements for use in said comparing step.

2. The method according to claim 1 further including the steps of:
    (a) reading out the first and further screen threshold values from respective memories; and
    (b) randomly selecting one of said first and further screen threshold values read out from said memories for use in said comparing step.

3. The method according to claim 1 further including the steps of:
    (a) digitizing the image signal values and storing them in a memory; and
    (b) reading out the stored image signal values from the memory for comparison with the first or further screen threshold values.

4. The method according to claim 1 further including the step of storing the screen threshold values allocated to the matrix elements of said first matrix and said further matrix in respective matrix memories at locations defined by addresses $x'$, $y'$.

5. The method according to claim 4 further including the steps of:
    (a) traversing the areal elements of the recording medium with said recording element;
    (b) determining first coordinate values u, v of the areal elements momentarily traversed by said recording element with respect to a first orthogonal coordinate system having axes directed in the recording direction of the recording element and perpendicular thereto;

(c) converting the first coordinate values u, v of the momentarily traversed areal elements into second coordinate values x, y with respect to a second orthogonal coordinate system aligned with said rotated screen and having axes which are oriented at said predetermined screen angle with respect to said first coordinate system, said second coordinate values x, y defining positions of the areal elements in the rotated screen;

(d) converting the second coordinate values x, y of the areal elements in the rotated screen into addresses x', y' of memory locations in the matrix memories whose matrix elements have the same positions within the respective matrices as the traversed areal elments within the screen meshes of the rotated screen; and (e) reading out the screen threshold values allocated to the determined first and further matrix elements from the matrix memories on the basis of said addresses x', y'.

6. The method according to claim 5 further including the step of converting the first coordinate values u, v into the second coordinate values x, y according to the relationship:

$$x = K_u \cdot u \cdot \cos\beta + K_v \cdot v \cdot \sin\beta$$

$$y = -K_u \cdot u \cdot \sin\beta + K_v \cdot v \cdot \cos\beta$$

wherein $\beta$ is the predetermined screen angle and $K_u$ and $K_v$ are scaling factors.

7. The method according to claim 5 further including the step of converting the second coordinate values x, y into the addresses x', y' of the matrix memories according to the equations:

$$x' = x \cdot \text{mod } x_0$$

$$y' = y \cdot \text{mod } y_0$$

where $x_0$ and $y_0$ are the number of matrix elements of the matrix memories in the directions of the axes of the second orthogonal coordinate system, and where mod $x_0$ and mod $y_0$ signify address calculations using modulo arithmetic.

8. The method according to claim 7 further including the steps of:

(a) providing the second coordinate values x, y as digital values; and (b) digitally executing the conversion of the digital second coordinate values x, y into the addresses x', y' by means of stripping higher-order bits of the digital second coordinate values x, y.

9. The method according to claim 1, further including the steps of:

(a) simultaneously recording a plurality of areal elements with a corresponding plurality of recording elements which are separately controlled by individual recording signals; and (b) generating the individual recording signals for controlling the plurality of recording elements by comparing screen threshold values corresponding to the plurality of areal elements with corresponding image signal values.

10. The method according to claim 9 further including the step of determining second coordinate values x, y of the plurality of areal elements simultaneously being recorded by said plurality of recording elements by adding constant amounts $\Delta x$, $\Delta y$ to determined second coordinate values x, y of one of said areal elements, said constant amounts $\Delta x$, $\Delta y$ representing distances of the others of said plurality of areal elements from said one areal element.

11. An apparatus for producing from an original a half-tone printing form having a rotated screen with an arbitrarily selectable predetermined screen angle and screen width with a recording element relatively moved across a recording medium, the screen comprising a plurality of periodically repeated screen meshes in which screen dots of different sizes are recorded as a function of tonal values of the original, said apparatus comprising:

(a) means for scanning the original opto-electronically point-by-point and line-by-line to generate image signal values representing the tonal values of the original;

(b) means for generating a first matrix comprising a plurality of matrix elements, said matrix elements having screen threshold values representing tonal values allocated to them, said screen threshold values representing a basic screen dot structure employed to produce the different size screen dots to be recorded in the screen meshes of the screen;

(c) means for sub-dividing the recording medium into a plurality of adjacent areal elements which are aligned in a recording direction of the recording element, with areal elements falling within the screen meshes being employed to form the screen dots in the screen meshes;

(d) means for comparing for each of the adjacent areal elements within a screen mesh at least one of said image signal values with a screen threshold value corresponding to the location of each said areal element within the screen mesh; and (e) means for generating a recording signal for each of said areal elements based on an output of said comparing means to control the recording element, said recording signal determining whether each said areal element is recorded or not as part of a screen dot within the screen mesh;

the improvement comprising:

(a) means for generating at least one further matrix having matrix elements, said matrix elements having screen threshold values allocated thereto which differ as compared with the screen threshold values of said first matrix for at least one tonal range;

(b) means for determining for each of said areal elements within a screen mesh a first matrix element and a further matrix element whose positions within the respective first matrix and further matrix correspond to the position of each said areal element within said screen mesh; and (c) means for randomly selecting one of the first and further screen threshold values allocated to the determined first and further matrix elements and providing the selected screen threshold value to said means for comparing.

12. In an apparatus for producing from an original a half-tone printing form having a rotated screen with an arbitrarily selectable predetermined screen angle and screen width wherein the screen comprises a plurality of periodically repeated screen meshes in which screen dots of different sizes are recorded as a function of tonal values of the original, said apparatus comprising:
(a) an opto-electronic scanning means for generating image signal values by point-by-point and line-by-line scanning of the original;
(b) a recording element means for line-by-line recording of screen dots on a recording medium, the recording element means being controllable by a recording signal and moving relative to the recording medium;
(c) coordinate determination means for continuously determining coordinate values of areal elements of the recording medium momentarily traversed by the recording element means with respect to an orthogonal coordinate system having an axis oriented parallel to a direction of the recorded lines of screen dots;
(d) coordinate transformation means connected to the coordinate determination means for converting the coordinate values into addresses;
(e) a raster generator connected to the coordinate transformation means and comprising a first matrix memory means addressable by the addresses for storing first screen threshold values;
(f) a comparison means connected to the raster generator, to the scanning means, and to the recording element means for generating the recording signal by comparing said image signal values with addressed screen threshold values;
the improvement comprising said raster generator having:
(a) a further matrix memory means connected to the coordinate transformation means for storing further screen threshold values which are respectively different for at least one tonal range from the first screen threshold values stored in the first matrix memory means;
(b) a selection stage means connected to the first matrix memory means and to the further matrix memory means for selecting either the first or further screen threshold values as a function of a randomly generated control signal; and
(c) a random generator means connected to the selection stage means for generating said control signal.

13. In a method for producing from an original a half-tone printing form having a rotated screen with an arbitrarily selectable predetermined screen angle and screen width by means of a recording element relatively moved across a recording medium, the screen comprising a plurality of periodically repeated screen meshes in which screen dots of different sizes are recorded as a function of tonal values of the original; a first matrix being provided having a plurality of matrix elements, the matrix elements each having first screen threshold values representing tonal values allocated to them and forming a value pattern, said screen threshold values representing a basic structure of the screen mesh which periodically repeats to form the screen; the recording medium being sub-divided into a plurality of adjacent areal elements aligned in a recording direction of the recording element, with areal elements falling within screen meshes being employed during recording to form the screen dots by use of the recording element; and a scree threshold value being obtained for each areal element within a screen mesh and wherein a recording signal which controls the recording element is generated by comparing the obtained screen threshold value with at least one of a plurality of image signal values generated by scanning the original so that a decision is made by means of said step of comparing to determine whether each said areal element is to be recorded or not as part of a screen dot within the screen mesh, the improvement comprising the steps of:
(a) generating at least one further matrix having matrix elements and allocating further screen threshold values to the matrix elements of said further matrix, said further screen threshold values creating a value pattern which differs from said value pattern of said first matrix for at least one tonal range;
(b) determining for each areal element within a screen mesh those matrix elements whose positions within the first matrix and the further matrix correspond to a position of each said areal element within the screen mesh; and
(c) in said step of comparing, randomly selecting a screen threshold value from either the first or further screen threshold values allocated to the determined matrix elements in the first matrix or further matrix and comparing the randomly selected value with the at least one of said image signal values.

14. A method for producing from an original a half-tone printing form having a rotated screen with an arbitrarily selectable predetermined screen angle by means of a recording element relatively moved across a recording medium, comprising the steps of:
(a) forming the screen from a plurality of periodically repeated screen meshes in which screen dots of different sizes are recorded as a function of tonal values of the original;
(b) providing at least first and second matrices each having a plurality of matrix elements, the first matrix storing a first value pattern of first screen threshold values and the second matrix storing a second value pattern of second screen threshold values, the first and second value patterns differing for at least one tonal range;
(c) sub-dividing the recording medium into a plurality of adjacent areal elements aligned in a recording direction of the recording element, with areal elements falling within the screen meshes being employed during recording to form the screen dots by use of the recording element;
(d) randomly selecting from either the first matrix or the second matrix a first screen threshold value or a second screen threshold value from a position in either the first or second matrix which corresponds to the position of an areal element within a screen mesh to be recorded; and
(e) comparing the selected screen threshold value with at least one of a plurality of image signal values generated by scanning the original so that a decision is made to determine whether the areal element is to be recorded or not as a part of a screen dot within the screen mesh to be recorded.

15. A system for producing from an original a half-tone printing form having a rotated screen with an arbitrarily selectable predetermined screen angle by means of a recording element relatively moved across a recording medium, comprising:
(a) means for forming the screen from a plurality of periodically repeated screen meshes in which screen dots of different sizes are recorded as a function of tonal values of the original;

(b) means for generating at least first and second matrices each having a plurality of matrix elements, the first matrix having a first value pattern of first screen threshold values stored therein and the second matrix having a second value pattern of second screen threshold values stored therein, the first and second value patterns differing for at least one tonal range;

(c) means for sub-dividing the recording medium into a plurality of adjacent areal elements aligned in a recording direction of the recording element, with areal elements falling within the screen meshes being employed during recording to form the screen dots by use of the recording element;

(d) means for randomly selecting from either the first matrix or the second matrix a first screen threshold value or a second screen threshold value from a position in either the first or second matrix which corresponds to the position of an areal element within a screen mesh to be recorded; and (e) means for comparing the selectal screen threshold value with at least one of a plurality of image signal values generated by scanning the original so that a decision is made to determine whether the areal element is to be recorded or not as a part of a screen dot within the screen mesh to be recorded.

* * * * *